UNITED STATES PATENT OFFICE.

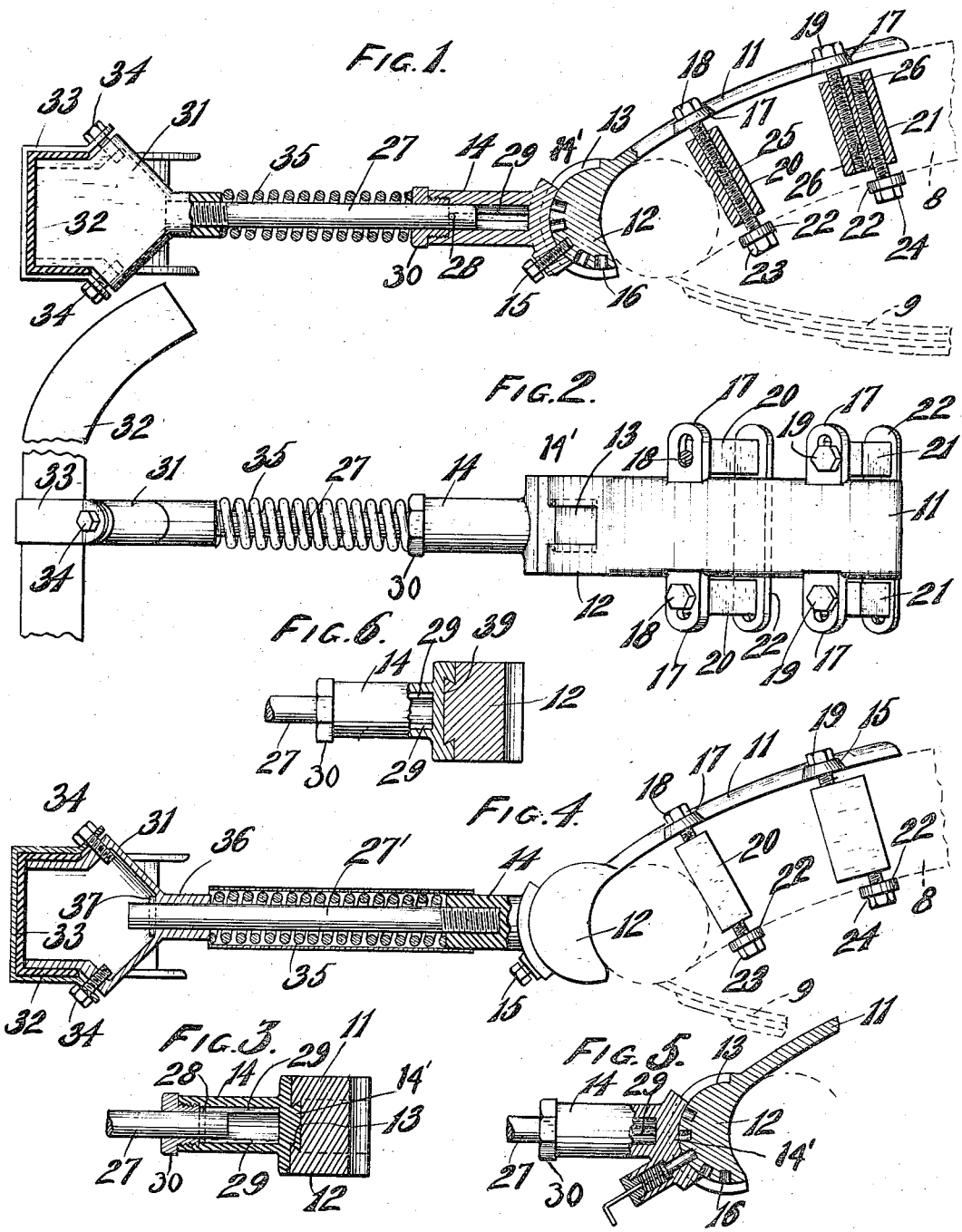

JAYSON K. BOND, OF MILWAUKEE, WISCONSIN, ASSIGNOR OF ONE-HALF TO KENNETH W. JACOBS, OF MILWAUKEE, WISCONSIN.

AUTOMOBILE-FENDER.

1,160,247.  Specification of Letters Patent.  Patented Nov. 16, 1915.

Application filed March 10, 1911.  Serial No. 613,496.

*To all whom it may concern:*

Be it known that I, JAYSON K. BOND, a citizen of the United States, residing in Milwaukee, in the county of Milwaukee and State of Wisconsin, have invented new and useful Improvements in Automobile-Fenders, of which the following is a description, reference being had to the accompanying drawings, which are a part of this specification.

This invention relates to improvements in automobile fenders and has for one of its objects to provide a fender which is adapted to be easily attached to automobiles of different kinds without the necessity of drilling holes or marring the frame of the automobile in any manner.

A further object of the invention is to provide an automobile fender in which the buffer bar may be swung and adjusted vertically to aline the plunger rods in a horizontal position.

A further object of the invention is to provide an automobile fender with means whereby it may be attached to the frame of an automobile provided with either full or half elliptical springs.

A further object of the invention is to provide a fender which is strong and durable and is inexpensive to manufacture.

With the above, and other objects in view, the invention consists of the automobile fender and its parts and combinations as set forth in the claims and all equivalents thereof.

In the accompanying drawing in which the same reference characters indicate the same parts in all of the views: Figure 1 is a vertical sectional view of one portion of the improved automobile fender shown connected to the frame of an automobile, said frame shown by dotted lines; Fig. 2 is a plan view of one of the side attaching members of the fender and a portion of the buffer bar; Fig. 3 is a horizontal sectional detail view of the bracket arm thereof; Fig. 4 is a vertical sectional view of one portion of a modified form of fender; Fig. 5 is a sectional detail view of a modified form of arm fastening means; and Fig. 6 is a detail partly in section of another modified form of arm connecting means.

For convenience of illustration the drawing only shows one half of the fender but it is to be understood that the specification and claims are intended to and do describe and claim the complete structure which consists of two attaching members operatively connected together by means of the buffer bar.

Referring to the drawing the numeral 8 indicates a portion of the frame and 9 a portion of the half elliptical spring of an automobile which is provided with the improved fender. The fender is constructed to be connected to the opposite front portions of the frame of the automobile and is provided with attaching means (only one being shown) for that purpose. Each attaching means consists of an upper connecting member 11 curved to conform to the upper front end of an automobile frame and is provided with an enlargement 12 on its forward end having a dovetail recess 13 formed in its front curved face. A tubular plunger rod arm 14, provided with a complementary curved face having a dovetail tongue 14' formed thereon engages the dovetail recessed portion of the attaching means and forms a pivotal connection therebetween. This arm 14 is provided with a bolt 15 threaded therethrough which is adapted to enter one of the recesses 16 of the enlargement 12 to adjust the angularity of the arm 14.

The connecting member 11 is provided with laterally extending slotted ears 17 through which extend bolts 18 and 19. These bolts are threaded into the ends of the threaded side members 20 and 21 which are positioned on opposite sides of the automobile frame 8. Clip plates 22 positioned beneath the frame 8 have bolts 23 and 24 extending therethrough which thread into the side members 20 and 21. The side members 20 have a threaded opening 25 extending therethrough into which the bolts 18 and 23 are threaded whereas the side members 21 are each provided with two threaded openings 26 extending therethrough to take the bolts 19 and 24. The construction of the side members 21 provides for greater adjustability than the construction of the side members 20 and in some cases may be substituted therefor.

A plunger rod 27 extends into each tubular arm and is provided with a transverse pin 28 which plays in the elongated side recesses 29 of the arm. A tubular bolt 30 surrounding the plunger rod and threaded into the arm serves to prevent the entire withdrawal of the rod. A buffer member 31 threaded on the forward end of the plunger rod is shaped to extend into the channel of the channel iron buffer 32 which is fastened to said buffer member by means of the strap 33 and the bolts 34. The strap extends around the channel bumper and laps over and is fastened to the buffer member by the bolts 34 which pass through the ends of the strap and are threaded into the member.

A coiled spring 35 surrounding each plunger rod and interposed between each plunger rod arm and each buffer member serves to hold the plunger rod yieldingly in its forward position.

In the modified form shown in Fig. 4 the rod 27' is threaded into the end of the plunger rod arm 14 and the buffer member 36 is of tubular formation and is positioned to slide freely on the rod. A pin 37 extending transversely through the rod limits the outward movement of said member. This modified form is provided with a coiled spring 35 similar to the spring of the first mentioned form and it performs the same function.

In the form shown in Fig. 5 a spring bolt 38 is substituted for the threaded bolt 15 and serves to lock the arm in adjusted position.

In Fig. 6 the dovetail connection 39 is reversed from that shown in the other forms, that is to say the tongue is formed on the arm and the groove is formed in the connecting member.

From the foregoing description it will be seen that the fender may be easily connected to automobile frames of various kinds and may be adjusted so that the yielding portion of the fender will be in a horizontal position and will readily give and cushion any blow received.

What I claim as my invention is:

1. An automobile fender comprising connecting members having curved forward portions provided with recesses, forwardly extending arms having rear curved portions which have a dovetail connection with the curved forward portions of the connecting members, bolts engaging the recesses of the connecting members and the arms to lock the arms to the members in adjusted positions, a buffer slidably carried by the arms, and springs interposed between the buffer and the arms.

2. An automobile fender comprising connecting members having curved forward portions provided with recesses, forwardly extending tubular arms having rear curved portions which have a dovetail connection with the curved forward portions of the connecting members, said curved portions of the arms provided with bolt openings, bolts extending through said openings and entering the recesses of the enlargements to lock the arms to the members in adjusted positions, plunger rods entering the tubular portions of the arms, a buffer carried by the plunger rods, and coiled springs surrounding the rods and interposed between the buffer and the arms.

3. An automobile fender comprising connecting members having curved forward portions provided with recesses, forwardly extending tubular arms having longitudinally extending slots and rear curved portions which have a dovetail connection with the curved forward portions of the connecting members, said curved portions of the arm provided with bolt openings, bolts extending through said openings and entering the recesses of the enlargements to lock the arms to the members in adjusted positions, plunger rods slidably extending into the tubular portions of the arms, pins in said rods slidable in the longitudinally extending slots in said arms, buffer members carried by the outer ends of said rods, coiled springs surrounding the plunger rods and interposed between the arms and the buffer members, and a bumper carried by the buffer member.

4. An automobile fender comprising connecting members having (curved forward portions provided with recesses and also having laterally extending slotted ears, threaded side members, bolts extending through the slotted ears and threaded into the side members, clip plates extending beneath the connecting members, bolts extending through the clip plates and threaded into the side members, forwardly extending arms connected to said connecting members, plunger rods slidably connected to said arms, members carried by the outer ends of said rods, coiled springs surrounding the rods and interposed between the arms and the buffer members, and a buffer extending from one buffer member to the other.

5. An automobile fender comprising connecting members having curved forward portions, forwardly extending arms having rear curved portions which engage the curved portions of the connecting members, a dove-tail connection between the curved portions of the members and arms, a buffer slidably carried by the arms, and springs interposed between the buffer and the arms.

In testimony whereof, I affix my signature, in presence of two witnesses.

JAYSON K. BOND.

Witnesses:
LAURA A. KELLEY,
KATHERINE HOLT.